United States Patent
Choi et al.

(10) Patent No.: US 9,651,159 B2
(45) Date of Patent: May 16, 2017

(54) PILOT SIGNAL BLOCK ASSEMBLY FOR CONSTRUCTION MACHINERY AND CONTROL VALVE ASSEMBLY HAVING THE SAME

(71) Applicant: Doosan Infracore Co., Ltd., Incheon (KR)

(72) Inventors: Dae Gyun Choi, Gyeonggi-do (KR); Hee Seog Kong, Gyeonggi-do (KR); Ki Hwan Hong, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 33 days.

(21) Appl. No.: 14/719,558

(22) Filed: May 22, 2015

(65) Prior Publication Data

US 2015/0337969 A1    Nov. 26, 2015

(30) Foreign Application Priority Data

May 23, 2014 (KR) .................. 10-2014-0061956

(51) Int. Cl.

| | | |
|---|---|---|
| *F15B 13/08* | (2006.01) | |
| *F16K 27/04* | (2006.01) | |
| *F16K 11/22* | (2006.01) | |
| *E02F 9/22* | (2006.01) | |
| *F16K 31/02* | (2006.01) | |
| *F16K 11/02* | (2006.01) | |
| *F16K 27/00* | (2006.01) | |

(52) U.S. Cl.
CPC .......... *F16K 11/02* (2013.01); *F15B 13/0817* (2013.01); *F15B 13/0842* (2013.01); *F15B 13/0871* (2013.01); *F16K 27/003* (2013.01); *F16K 31/02* (2013.01); *E02F 9/2267* (2013.01); *Y10T 137/6007* (2015.04)

(58) Field of Classification Search
CPC ....... Y10T 137/6007; Y10T 137/87885; E02F 9/2267; F15B 13/0817; F15B 13/0842; F15B 13/0871; F16K 27/003
See application file for complete search history.

(56) References Cited

U.S. PATENT DOCUMENTS

| | | | | |
|---|---|---|---|---|
| 2,650,609 | A * | 9/1953 | Herbst | ................ F15B 13/0431 137/596.14 |
| 3,918,488 | A * | 11/1975 | Minami | .................. B60T 13/18 137/596.16 |
| 3,918,489 | A * | 11/1975 | Foster | ..................... C03B 9/406 137/596.16 |

(Continued)

*Primary Examiner* — Seth W MacKay-Smith
(74) *Attorney, Agent, or Firm* — John D. Veldhuis-Kroeze; Westman, Champlin & Koehler, P.A.

(57) ABSTRACT

A pilot signal block assembly includes at least two base blocks arranged to be spaced apart from each other in a first direction and having a plurality of receiving holes configured to move a spool therein in one direction, a plurality of cartridge blocks arranged on a surface of the base block to be spaced apart from each other in a second direction, each of the cartridge blocks including a signal passage which is in fluid communication with the corresponding receiving hole to supply a pilot oil to the corresponding receiving hole, and a plurality of electro proportional pressure reducing valves installed in the cartridge blocks respectively and controlling an opening rate of the signal passage in proportional to an electric control signal.

16 Claims, 9 Drawing Sheets

(56) References Cited

U.S. PATENT DOCUMENTS

| | | | | |
|---|---|---|---|---|
| 3,976,098 | A * | 8/1976 | Raymond | F15B 13/0807 |
| | | | | 137/271 |
| 4,485,846 | A * | 12/1984 | Neff | F15B 13/043 |
| | | | | 137/454.2 |
| 4,718,451 | A * | 1/1988 | Kosugi | F15B 13/0402 |
| | | | | 137/596.16 |
| 5,086,803 | A * | 2/1992 | Nakajima | F15B 13/0817 |
| | | | | 137/270 |
| 5,435,349 | A * | 7/1995 | Borbone | C03B 9/40 |
| | | | | 137/269 |
| 5,437,306 | A * | 8/1995 | Asou | F15B 13/0821 |
| | | | | 137/625.64 |
| 5,632,306 | A * | 5/1997 | Taka | F15B 13/0402 |
| | | | | 137/596.16 |
| 5,704,399 | A * | 1/1998 | Hayashi | F15B 13/0817 |
| | | | | 137/271 |
| 5,718,263 | A * | 2/1998 | Sato | F15B 13/0402 |
| | | | | 137/271 |
| 5,765,589 | A * | 6/1998 | Stoll | F15B 13/0814 |
| | | | | 137/271 |
| 5,915,409 | A * | 6/1999 | Kaneko | F15B 13/0814 |
| | | | | 137/270 |
| 6,964,281 | B2 * | 11/2005 | Pieper | F15B 13/0814 |
| | | | | 137/596.12 |
| 8,453,678 | B2 * | 6/2013 | Neff | F16K 11/07 |
| | | | | 137/625.27 |
| 8,800,600 | B2 * | 8/2014 | Huang | F15B 13/043 |
| | | | | 137/596.14 |
| 8,925,587 | B2 * | 1/2015 | Miyazoe | F15B 13/0402 |
| | | | | 137/596.14 |

* cited by examiner

SECOND
DIRECTION
↑
⊗
FIRST
DIRECTION

FIG. 9

FIRST
DIRECTION
↑

SECOND
DIRECTION

PILOT SIGNAL BLOCK ASSEMBLY FOR CONSTRUCTION MACHINERY AND CONTROL VALVE ASSEMBLY HAVING THE SAME

CROSS-REFERENCE TO RELATED APPLICATION

This application claims priority under 35 USC §119 to Korean Patent Application No. 10-2014-0061956, filed on May 23, 2014 in the Korean Intellectual Property Office (KIPO), the contents of which are herein incorporated by reference in their entirety.

BACKGROUND

1. Field

Example embodiments relate to a pilot signal block assembly and a control valve assembly having the same. More particularly, example embodiments relate to a pilot signal block assembly for construction machinery and a control valve assembly having the same.

2. Description of the Related Art

Recently, the necessity of electronic control in construction machinery is increasing more and more. Especially, in the electronic control in the construction machinery, a main control valve may include an electro proportional pressure reducing valve. The electro proportional pressure reducing valve may control movement of spools in response to an electric control signal. For example, the electro proportional pressure reducing valve may control the movement of the spools in proportional to a voltage signal or a current signal applied thereto.

The electro proportional pressure reducing valve may control an opening rate of a signal passage into which a pilot oil flows in order to control the movement of the spool. Generally, the control valve assembly may include a plurality of spools and a plurality of electro proportional pressure reducing valves. When the spool is replaced for maintenance, a working oil such as the pilot oil may be leaked due to a complicated structure of the control valve assembly, a large amount of the working oil may be required to be replenished and it may be difficult to reassemble the control valve assembly.

SUMMARY

Example embodiments provide a pilot signal block assembly capable of preventing a working oil leakage during maintenance.

Example embodiments provide a control valve assembly capable of preventing a working oil leakage during maintenance.

According to example embodiments, a pilot signal block assembly includes at least one base block having a plurality of receiving holes penetrating therethrough to provide a pressure space for moving a spool therein, and a plurality of cartridge blocks detachably combined with the base block and spaced apart from each other to cover the receiving holes respectively. Each of the cartridge blocks includes a signal passage which is in fluid communication with the corresponding receiving hole to supply a pilot oil to the corresponding receiving hole.

In example embodiments, the receiving hole may have a diameter greater than a diameter of the spool such that the spool is replaced through the receiving hole.

In example embodiments, the cartridge block may include a pump passage supplying the pilot oil to the signal passage and a drain passage connected to the pump passage to drain the pilot oil from the cartridge block.

In example embodiments, the base block may further include a pump distribution passage and a drain collection passage. The pump distribution passage may be in fluid communication with the pump passage such that the pilot oil is distributed and supplied into the pump passage, and the drain collection passage may be in fluid communication with the drain passage such that the pilot oil drained from the drain passage is collected to the drain collection passage.

In example embodiments, the base block may further include an inlet port connected to a pilot oil pump such that the pilot oil is supplied into the base block through the inlet port, and an outlet port connected to an oil tank such that the pilot oil collected to the drain collection passage is drained to the oil tank through the outlet port.

According to example embodiments, a pilot signal block assembly includes at least two base blocks arranged to be spaced apart from each other in a first direction and having a plurality of receiving holes configured to move a spool therein in one direction, a plurality of cartridge blocks arranged on a surface of the base block to be spaced apart from each other in a second direction, each of the cartridge blocks including a signal passage which is in fluid communication with the corresponding receiving hole to supply a pilot oil to the corresponding receiving hole, and a plurality of electro proportional pressure reducing valves installed in the cartridge blocks respectively and controlling an opening rate of the signal passage in proportional to an electric control signal.

In example embodiments, the receiving hole may be formed to penetrate through the base block to provide a pressure space for moving the spool.

In example embodiments, the receiving hole may have a diameter greater than a diameter of the spool such that the spool is replaced through the receiving hole.

In example embodiments, the cartridge block may include a pump passage supplying the pilot oil to the signal passage and a drain passage connected to the pump passage to drain the pilot oil from the cartridge block.

In example embodiments, the base block may further include a pump distribution passage and a drain collection passage. The pump distribution passage may be in fluid communication with the pump passage such that the pilot oil is distributed and supplied into the pump passage, and the drain collection passage may be in fluid communication with the drain passage such that the pilot oil drained from the drain passage is collected to the drain collection passage.

In example embodiments, the base block may further include an inlet port connected to a pilot oil pump such that the pilot oil is supplied into the base block through the inlet port, and an outlet port connected to an oil tank such that the pilot oil collected to the drain collection passage is drained to the oil tank through the outlet port.

In example embodiments, the second direction may be substantially perpendicular to the first direction.

According to example embodiments, a control valve assembly includes a main block, a first pilot signal block assembly, and a second pilot signal block assembly. The main block has a spool which is installed movable therein to control a path into which a working fluid discharged from a hydraulic pump flows. The first pilot signal block assembly includes at least two base blocks arranged on a first side of the main block to be spaced apart from each other and having a plurality of receiving holes configured to move a spool therein in one direction, a plurality of cartridge blocks arranged on a surface of the base block to be spaced apart from each other, each of the cartridge blocks including a first signal passage which is in fluid communication with the corresponding receiving hole to supply a pilot oil to the corresponding receiving hole, and a plurality of first electro proportional pressure reducing valves installed in the cartridge blocks respectively and controlling an opening rate of the first signal passage in proportional to an electric control signal. The second pilot signal block assembly includes at least two pilot signal blocks arranged on a second side of the main block opposite to the first side of the main block to be spaced apart from each other and having a plurality of second passages configured to move the spool in a reverse direction, and a plurality of second electro proportional pressure reducing valves installed in the pilot signal block respectively and controlling an opening rate of the second signal passage in proportional to an electric control signal.

In example embodiments, the receiving hole may be formed to penetrate through the base block to provide a pressure space for moving the spool.

In example embodiments, the cartridge block may include ea first pump passage supplying the pilot oil to the first signal passage and a first drain passage connected to the first pump passage to drain the pilot oil from the cartridge block.

In example embodiments, the pilot signal block may include a second pump passage supplying the pilot oil to the second signal passage and a second drain passage connected to the second pump passage to drain the pilot oil from the pilot signal block.

According to example embodiments, a pilot signal block assembly may include at least one base block and a plurality of cartridge blocks arranged on the base block to be spaced apart from each other. The base block may include a distribution passage distributing a pilot oil discharged from a pilot oil pump and a collection passage collecting the drained pilot oil. Accordingly, production cost may be reduced, productivity may be improved and an oil leakage may be prevented compared with a conventional control valve assembly which requires as many outer connection hoses as the number of blocks.

Further, the cartridge block may have a structure simpler than the base block 210 and only the cartridge block corresponding to the spool to be replaced may be detached to replace the spool. Accordingly, because it may not be necessary to detach the base block from the main block in order to the replace the spool, a leakage of the pilot oil may be prevented. Further, only a damaged cartridge block may be replaced without disassembling the whole assembly.

BRIEF DESCRIPTION OF THE DRAWINGS

Example embodiments will be more clearly understood from the following detailed description taken in conjunction with the accompanying drawings.

FIGS. 1 to 9 represent non-limiting, example embodiments as described herein.

DESCRIPTION OF EMBODIMENTS

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
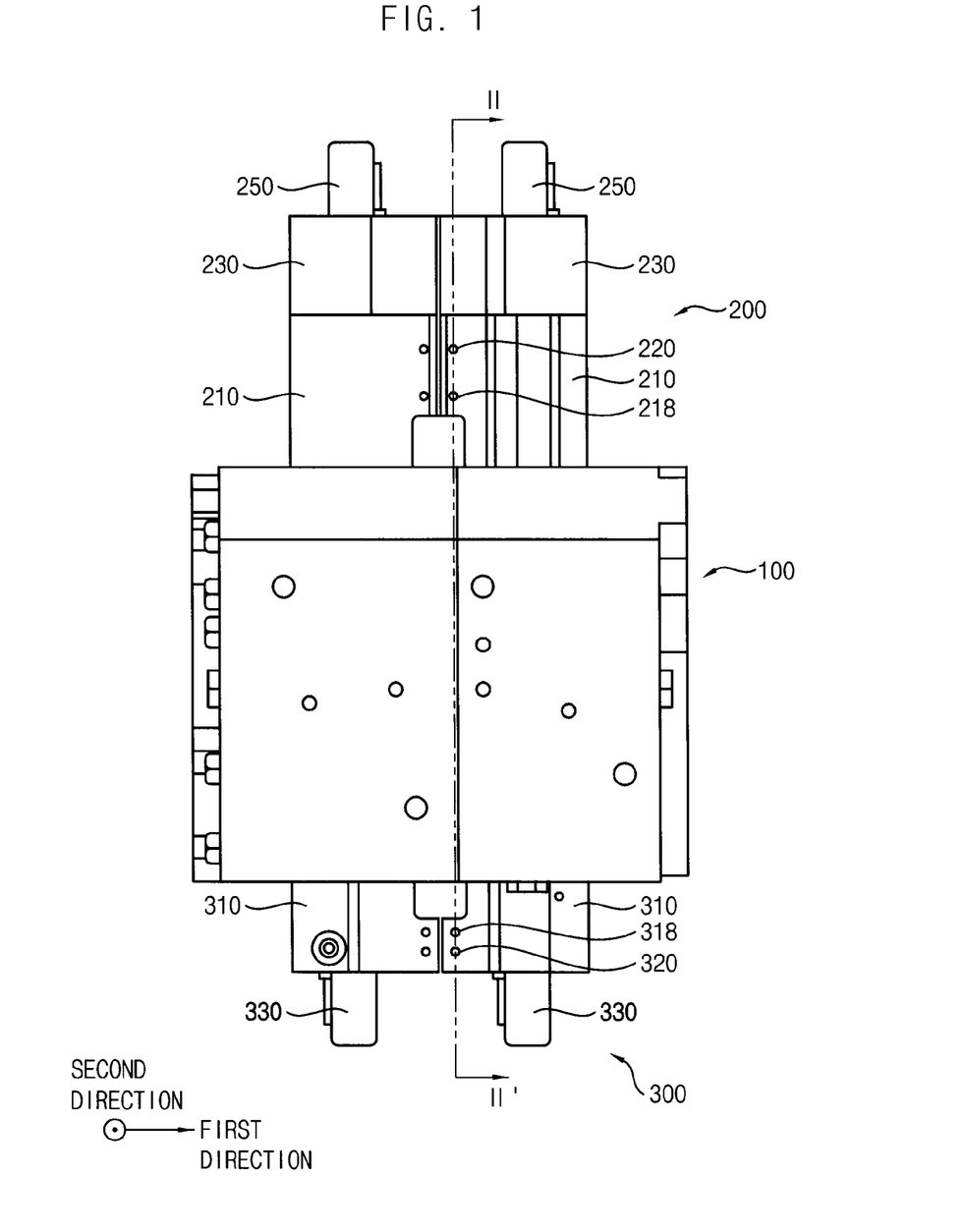
FIG. 1 is a plan view illustrating a control valve assembly in accordance with example embodiments.
Figure 2:
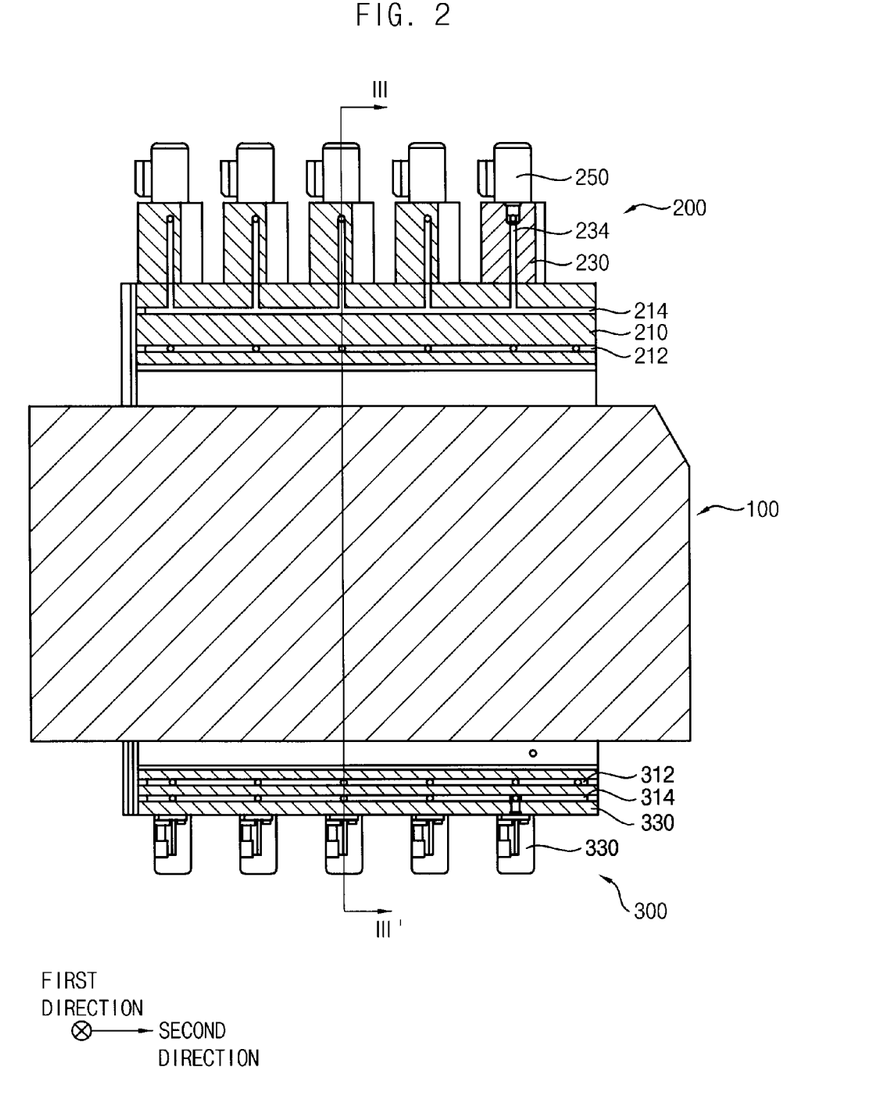
FIG. 2 is a cross-sectional view taken along the line II-II' in FIG. 1.
Figure 3:
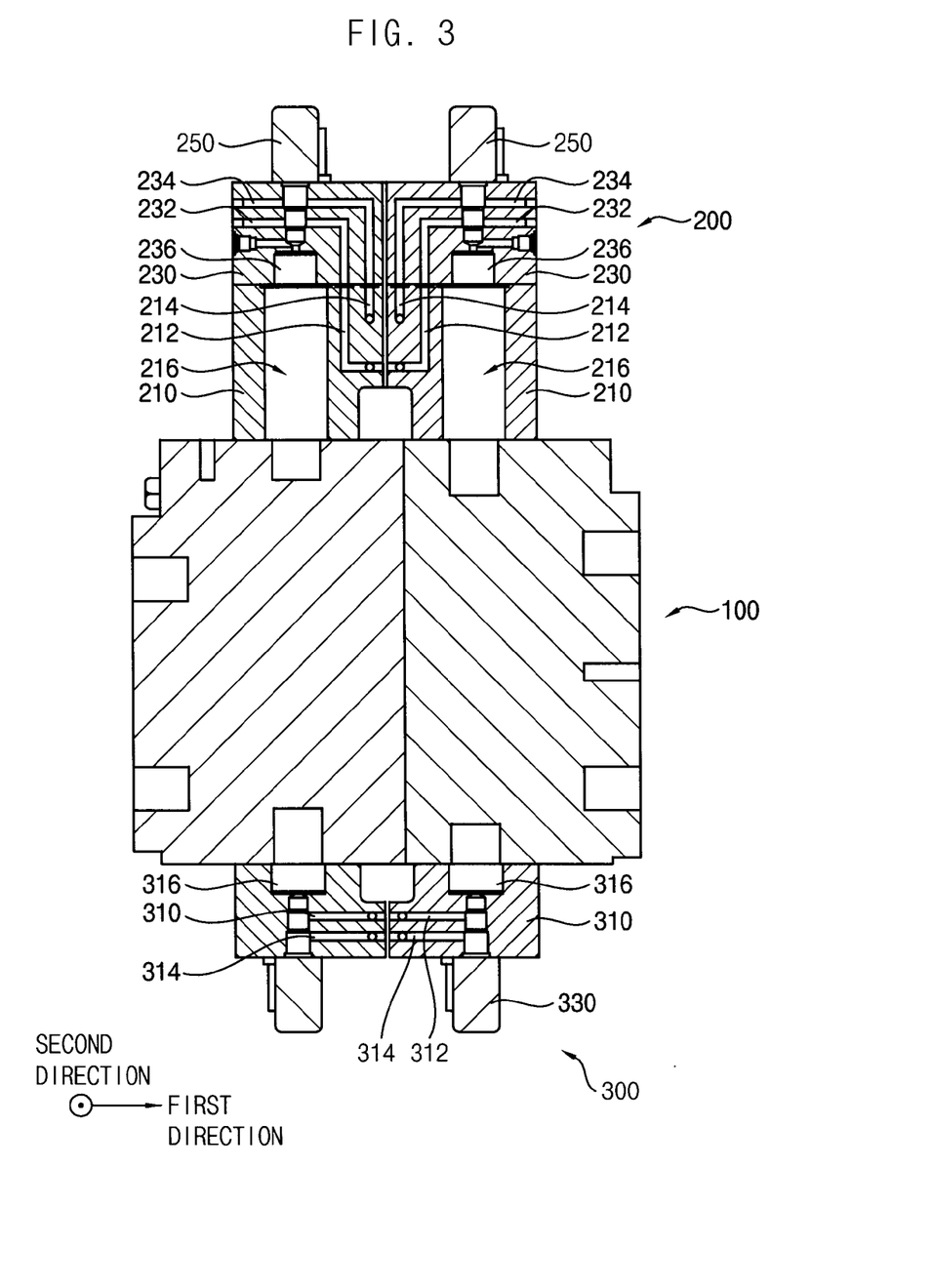
FIG. 3 is a cross-sectional view taken along the line III-III' in FIG. 2.
Figure 4:
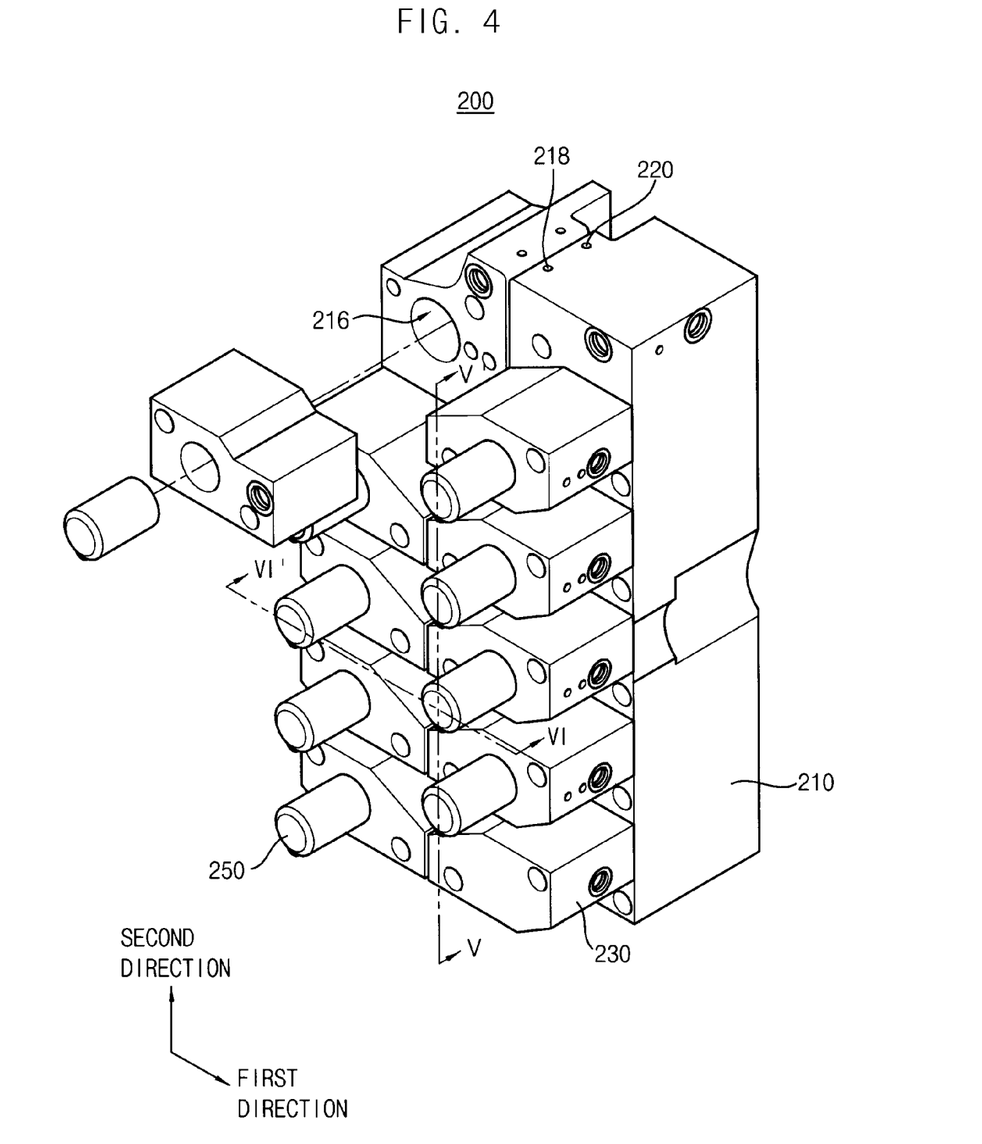
FIG. 4 is a perspective view illustrating a first pilot signal block assembly in FIG. 1.
Figure 5:
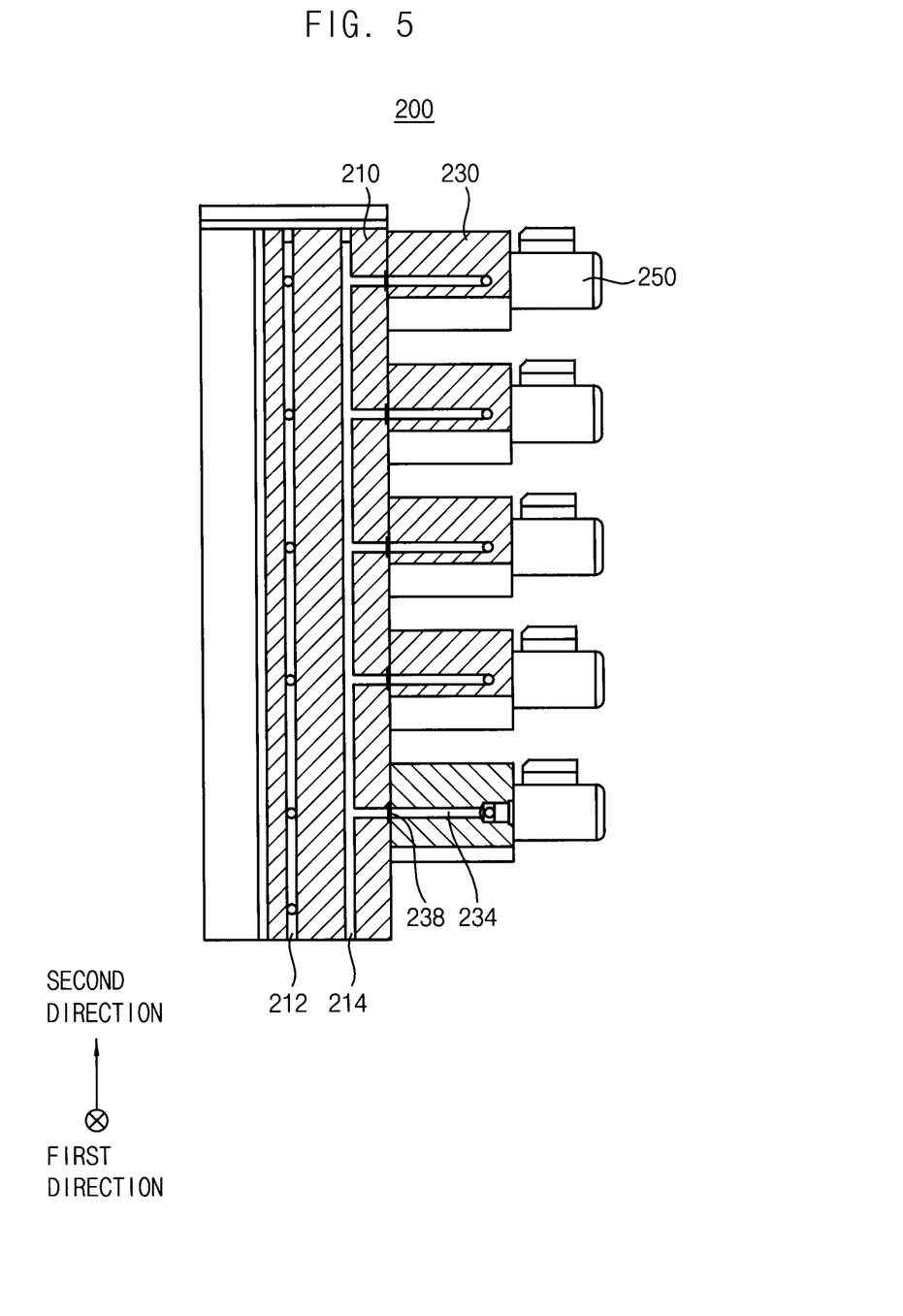
FIG. 5 is a cross-sectional view taken along the line V-V' in FIG. 4.
Figure 6:
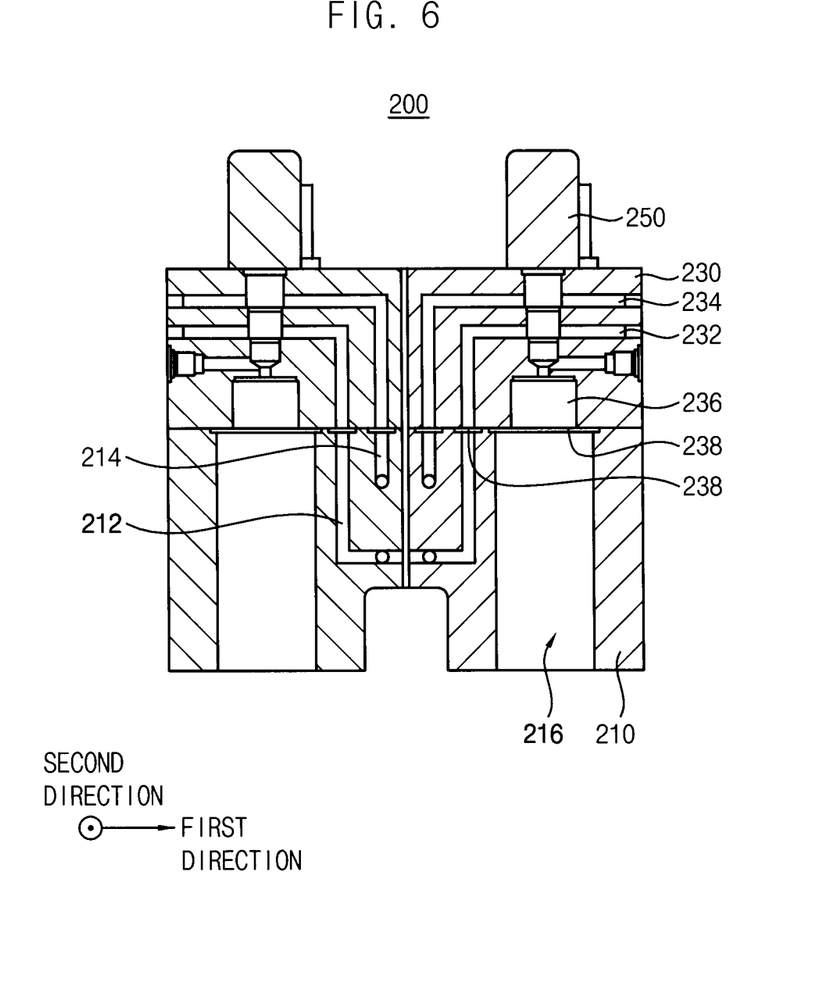
FIG. 6 is a cross-sectional view taken along the line VI-VI' line in FIG. 4.
Figure 7:
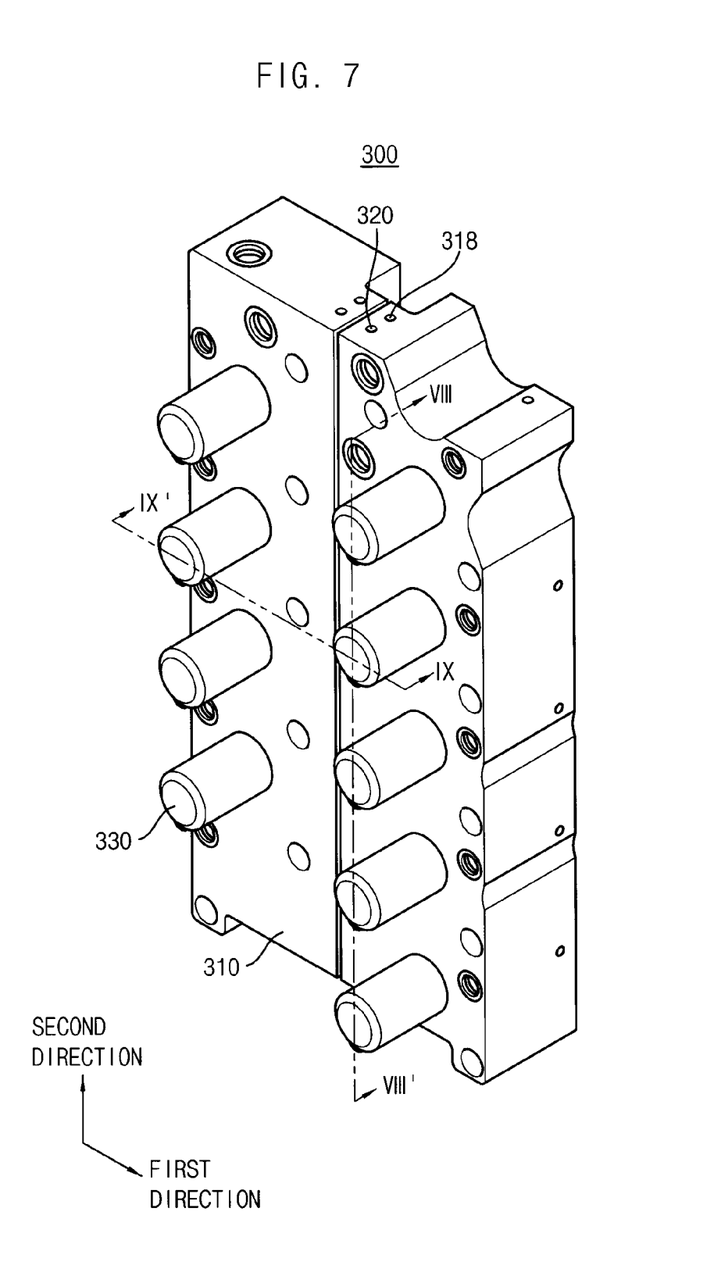
FIG. 7 is a perspective view illustrating a second pilot signal block assembly in FIG. 1.
Figure 8:
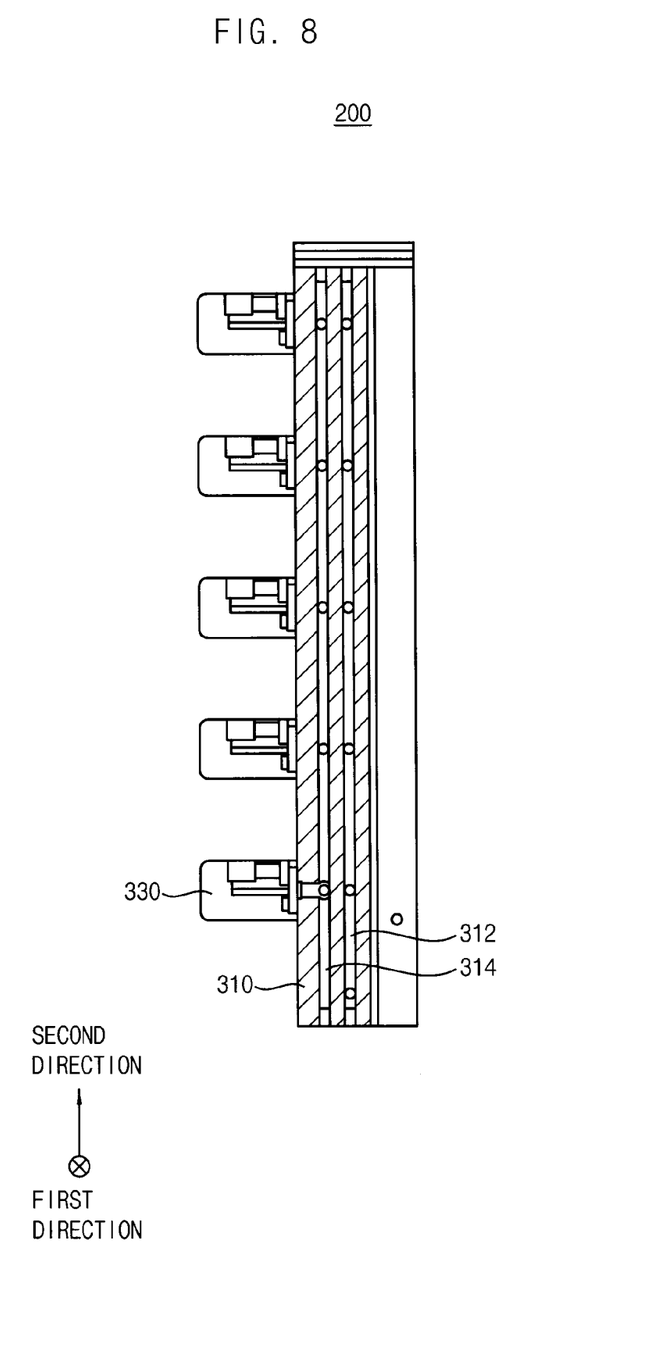
FIG. 8 is a cross-sectional view taken along the line VIII-VIII' in FIG. 7.
Figure 9:
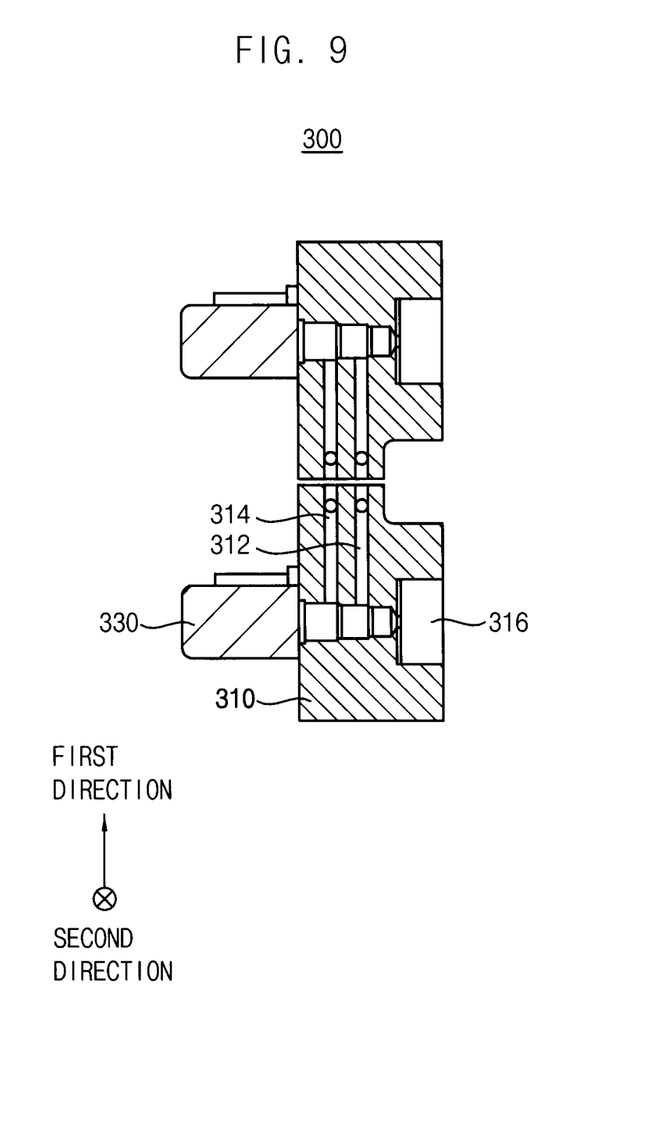
FIG. 9 is a cross-sectional view taken along the line IX-IX' in FIG. 7.

FIG. 1 is a plan view illustrating a control valve assembly in accordance with example embodiments. FIG. 2 is a cross-sectional view taken along the line II-II' in FIG. 1. FIG. 3 is a cross-sectional view taken along the line III-III' in FIG. 2. FIG. 4 is a perspective view illustrating a first pilot signal block assembly in FIG. 1. FIG. 5 is a cross-sectional view taken along the line V-V' in FIG. 4. FIG. 6 is a cross-sectional view taken along the line VI-VI' line in FIG. 4. FIG. 7 is a perspective view illustrating a second pilot signal block assembly in FIG. 1. FIG. 8 is a cross-sectional view taken along the line VIII-VIII' in FIG. 7. FIG. 9 is a cross-sectional view taken along the line IX-IX' in FIG. 7.

Referring to FIGS. 1 to 9, a control valve assembly may include a main block 100 having a spool which is installed movable therein to control a path into which a working fluid discharged from a hydraulic pump flows, a first pilot signal block assembly 200 disposed in a first side of the main block 100 and receiving a pilot oil which is supplied into the first pilot signal block assembly 200 to move the spool in one direction (for example, backward direction), and a second pilot signal block assembly 300 disposed in a second side of the main block 100 opposite to the first side and receiving the pilot oil which is supplied into the second pilot signal block assembly 300 to move the spool in a reverse direction (for example, frontward direction).

A plurality of the spools (not illustrated) may be installed inside the main block 100. The spools may be provided to movable parallel with one another in the main block 100. The spools may correspond to actuators respectively. The spool may control the path of the working fluid. For example, when the spool is in a neutral position, the working fluid discharged from the hydraulic pump may be returned to an oil tank. When the spool is moved from the neutral position to an operating position, the hydraulic pump and the actuator may communicate with each other such that the working fluid is supplied to the actuator.

The first pilot signal block assembly 200 may include at least two base blocks 210, a plurality of cartridge blocks 230, and a plurality of first electro proportional pressure reducing valves 250.

The base blocks 210 may be arranged on the first side of the main block 100 to be spaced apart from each other in a first direction. For example, the base blocks 210 may be disposed in the first side of the main block 100 such that the base blocks 210 may be fastened to the first side of the main block 100 by a plurality of bolts respectively.

The base blocks 210 may be detachably combined with the main block 100. As illustrated in FIG. 4, two base blocks 210 may be arranged in the first direction, however, the number of the base blocks may not be limited thereto.

A plurality of receiving holes 216 may be formed in the base block 210. The pilot oil may be supplied into the receiving hole 216 to move the spool in one direction. The pilot oil supplied into the receiving hole 216 may form a hydraulic pressure capable of moving the spool. That is, the receiving hole 216 may serve as a pressure space for forming the hydraulic pressure for moving the spool. Additionally, a return spring (not illustrated) may be provided in the receiving hole 216 to resiliently support the spool in a direction opposite to a shifted direction of the spool.

The receiving hole 216 may be formed to penetrate through the base block 210. The receiving hole 216 may have a diameter greater than a diameter of the spool such that the spool may be replaced through the receiving hole 216. Once the one cartridge block 230 corresponding to the spool to be replaced is detached from the base block 210, the spool may be replaced through the receiving hole 216 penetrating through the base block 210.

In example embodiments, an inlet port 218 may be formed in the base block 210. The inlet port 218 may be connected to the pilot oil pump (not illustrated) such that the pilot oil may be supplied into the base block 210 through the inlet port 218. A pump distribution passage 212 may be formed in the base block 210. The pump distribution passage 212 may be connected to the inlet port 218 such that the pilot oil supplied from the inlet port 218 may be distributed to a first pump passage 232 which will be described later.

A drain collection passage 214 may be formed in the base block 210. The drain collection passage 214 may be connected to a first drain passage 234 which will be described later. The pilot oil drained from the first drain passage 234 may be collected to the drain collection passage 214.

An outlet port 220 may be formed in the base block 210. The pilot oil collected to the drain collection passage 214 may be drained to the oil tank through the outlet port 220.

The base block 210 may have the pump distribution passage 212, the inlet port 218, the drain collection passage 214 and the outlet port 220, to distribute and collect the pilot oil in the base block 210. While a conventional control valve assembly may require as many outer connection hoses as the number of pilot signal blocks, a control valve assembly according to example embodiments may require a hose connected to the inlet port 218 and a hose connected to the outlet port 220, thereby reducing production cost, improving productivity and reducing a possibility of an oil leakage.

The cartridge blocks 230 may be arranged on a surface of the base block 210 to be spaced apart from each other in a second direction substantially perpendicular to the first direction. For example, the cartridge blocks 230 may be disposed in a side of the base block 210 such that the cartridge blocks 230 may be fastened to the side of the base block 210 by a plurality of bolts respectively.

The cartridge blocks 230 may be detachably combined with the base block 210. As illustrated in FIG. 4, five cartridge blocks 230 may be arranged in the second direction, however, the number of the cartridge blocks may not be limited thereto.

Additionally, as illustrated in FIGS. 5 and 6, the base block 210 and the cartridge block 230 may be sealed tightly with each other by a sealing member 238.

For example, the pump distribution passage 212 of the base block 210 may be in fluid communication with the first pump passage 232 of the cartridge block 230, and the pump distribution passage 212 and the first pump passage 232 may be sealed tightly with each other by the sealing member 238. Additionally, the drain collection passage 214 of the base block 210 may be in fluid communication with the first drain passage 234 of the cartridge block 230, and the drain connection passage 214 and the first drain passage 234 may be sealed tightly with each other by the sealing member 238. Further, the receiving hole 216 of the base block 210 may be in communication with a first signal passage 236 of the cartridge block 230, and the receiving hole 216 and the first signal passage 236 may be sealed tightly with each other by the sealing member 238. For example, the sealing member 238 may include an O-ring having a rubber material.

The cartridge block 230 may include the first pump passage 232 supplying the pilot oil to the first signal passage 236 and the first drain passage 234 connected to the first pump passage 232 to drain the pilot oil therefrom.

The first signal passage 236 may be in fluid communication with the receiving hole 216 of the base block 210 to supply the pilot oil inputted from the first pump passage 232 to the receiving hole 216. The pilot oil may be supplied through the first signal passage 236 to the receiving hole 216 to form the hydraulic pressure for moving the spool in the receiving hole 216.

The first pump passage 232 may be in fluid communication with the pump distribution passage 212 of the base block 210 such that the pilot oil inputted from the pump distribution passage 212 to the first pump passage 232 may flow into the first drain passage 234 or the first signal passage 236 according to an operation of the first electro proportional pressure reducing valves 250.

The first drain passage 234 may serve as a passage for draining the pilot oil inputted to the first pump passage 232. The first drain passage 234 may be in fluid communication with the drain collection passage 214 to collect the drained pilot oil.

The cartridge block 230 may have a structure simpler than the base block 210. Accordingly, only the cartridge block 230 corresponding to the spool to be replaced may be detached to replace the spool, and then, the cartridge block 230 may be easily assembled again with the base block 210.

As illustrated in FIG. 4, once the cartridge block 230 corresponding to the spool to be replaced is detached from the base block 210, the spool may be replaced through the receiving hole 216 which penetrates through the base block 210 and has a diameter greater than a diameter of the spool. Accordingly, because it may not be necessary to detach the base block 210 from the main block 100 in order to the replace the spool, a leakage of the pilot oil may be prevented and the control valve assembly may be re-assembled easily.

The first electro proportional pressure reducing valves 250 may be installed in the cartridge blocks 230 respectively. The first electro proportional pressure reducing valve 250 may control opening rates of the first signal passage 236, the first pump passage 232 and the first drain passage 234.

In particular, when a control signal for moving the spool is inputted to the first electro proportional pressure reducing valve 250, the first electro proportion pressure reducing valve 250 may control such that the first pump passage 232 communicates with the first signal passage 236. The pilot oil discharged from the pilot oil pump may be supplied to the receiving hole 216 of the base block 210 through the inlet port 218, the pump distribution passage 212, the first pump passage 232 and the first signal passage 236. The pilot oil supplied into the receiving hole 216 may form a hydraulic pressure capable of moving the spool in one direction.

When a control signal for returning the spool in a direction opposite to a shifted direction of the spool is inputted to the first electro proportional pressure reducing valve 250, the first electro proportion pressure reducing valve 250 may control such that the first pump passage 232 communicates with the first drain passage 234. The pilot oil inputted from the first pump passage 232 may be returned to the oil tank through the first drain passage 234, the drain collection passage 214 and the outlet port 220.

Alternatively, when the control signal for moving the spool is inputted to the first electro proportional pressure reducing valve 250, the first electro proportional pressure reducing valve 250 may control the opening rates of the first pump passage 232, the first signal passage 236 and the first drain passage 234. The spool may be shifted in response to the opening rates determined by the first electro proportional pressure reducing valve 250.

The second pilot signal block assembly 300 may include at least two pilot signal blocks 310, and a plurality of second electro proportional pressure reducing valves 330.

The pilot signal blocks 310 may be arranged on the second side of the main block 100 to be spaced apart from each other in the first direction. For example, the pilot signal blocks 310 may be disposed in the second side of the main block 100 such that the pilot signal blocks 310 may be fastened to the second side of the main block 100 by a plurality of bolts respectively.

The pilot signal blocks 310 may be detachably combined with the main block 100. As illustrated in FIG. 7, two pilot signal blocks 310 may be arranged in the first direction, however, the number of the pilot signal blocks may not be limited thereto.

A plurality of second signal passages 316 may be formed in the pilot signal block 310. The pilot oil may be supplied into the second signal passage 316 to move the spool in a reverse direction which is opposite to the shifted direction of the spool by the first signal block assembly 200.

The pilot oil supplied into the second signal passage 316 from a second pump passage 312 which will be described later may form a hydraulic pressure capable of moving the spool.

In example embodiments, an inlet port 318 may be formed in the pilot signal block 310. The inlet port 318 may be connected to the pilot oil pump (not illustrated) such that the pilot oil may be supplied into the inlet port 318. The second pump passage 312 may be formed in the pilot signal block 310. The second pump passage 312 may be connected to the inlet port 318 such that the pilot oil supplied from the inlet port 318 may be supplied to a second signal passage 316.

The pilot oil inputted from the second pump passage 312 may flow into a second drain passage 314 or the second signal passage 316 according to an operation of a second electro proportional pressure reducing valves 330 which will be described later.

The second drain passage 314 may be formed in the pilot signal block 310. The second drain passage 314 may be connected to the second pump passage 312 to drain the pilot oil from the second pump passage 312.

An outlet port 320 may be formed in the pilot signal block 310. The pilot oil collected to the second drain passage 314 may be drained to the oil tank through the outlet port 320.

The second electro proportional pressure reducing valves 330 may be installed in the pilot signal blocks 310 respectively. The second electro proportional pressure reducing valve 330 may control opening rates of the second signal passage 316, the second pump passage 312 and the second drain passage 314.

As mentioned above, the base block 210 may have the pump distribution passage 212, the inlet port 218, the drain collection passage 214 and the outlet port 220, to distribute and collect the pilot oil in the base block 210. While a conventional control valve assembly may require as many outer connection hoses as the number of pilot signal blocks, a control valve assembly according to example embodiments may require a hose connected to the inlet port 218 and a hose connected to the outlet port 220, thereby reducing production cost, improving productivity and preventing an oil leakage.

Further, the cartridge block 230 may have a structure simpler than the base block 210. Accordingly, only the cartridge block 230 corresponding to the spool to be replaced may be detached to replace the spool, and then, the cartridge block 230 may be easily assembled again with the base block 210. As illustrated in FIG. 4, once the cartridge block 230 corresponding to the spool to be replaced is detached from the base block 210, the spool may be replaced through the receiving hole 216 which penetrates through the base block 210. Accordingly, because it may not necessary to detach the base block 210 from the main block 100 in order to the replace the spool, a leakage of the pilot oil may be prevented. Further, only a damaged cartridge block 230 may be replaced without disassembling the whole assembly.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A pilot signal block assembly, comprising:
at least one base block, configured to be attached to a main block that includes a plurality of spools slidably installed therein, the at least one base block having a first surface and a second surface opposite to each other, the first surface coming in contact with the main block, and the base block having a plurality of receiving holes, each of the receiving holes penetrating through the base block from the first surface to the second surface to provide a pressure space for moving a spool, wherein the receiving hole is sized to allow movement of the spool from the first surface to the second surface through the receiving hole;
a plurality of cartridge blocks detachably combined with the at least one base block and spaced apart from each other on the second surface of the at least one base block, the cartridge blocks being arranged corresponding to the receiving holes to cover the receiving holes respectively, each of the cartridge blocks including a signal passage that is in fluid communication with a corresponding receiving hole of the plurality of receiving holes to supply a pilot oil to the corresponding receiving hole; and
a plurality of electro proportional pressure reducing valves installed in the cartridge blocks respectively and configured to control opening rates of the signal passages according to electric control signals.

2. The pilot signal block assembly of claim 1, wherein a receiving hole of the plurality of receiving holes has a diameter greater than a diameter of the spool.

3. The pilot signal block assembly of claim 1, wherein the cartridge block comprises a pump passage supplying the pilot oil to the signal passage and a drain passage connected to the pump passage to drain the pilot oil from the cartridge block.

4. The pilot signal block assembly of claim 3, wherein the at least one base block further comprises a pump distribution passage and a drain collection passage, wherein the pump distribution passage is in fluid communication with the pump passage such that the pilot oil is distributed and supplied into the pump passage, and the drain collection passage is in fluid communication with the drain passage such that the pilot oil drained from the drain passage is collected by the drain collection passage.

5. The pilot signal block assembly of claim 4, wherein the at least one base block further comprises an inlet port connected to a pilot oil pump such that the pilot oil is supplied into the base block through the inlet port; and an outlet port connected to an oil tank such that the pilot oil collected by the drain collection passage is drained to the oil tank through the outlet port.

6. A pilot signal block assembly, comprising:
at least two base blocks spaced apart from each other in a first direction, each of the base blocks having a first surface and a second surface opposite to each other, and having a plurality of receiving holes, each of the receiving holes penetrating through the base block from the first surface to the second surface and configured to allow movement of a spool in one direction from the first surface to the second surface;
a plurality of cartridge blocks removably attached to the base block, arranged on the second surface of the base block corresponding to the receiving holes to cover the receiving holes respectively, and spaced apart from each other in a second direction, each of the cartridge blocks including a signal passage that is in fluid communication with a corresponding receiving hole of the plurality of receiving holes to supply a pilot oil to the corresponding receiving hole; and
a plurality of electro proportional pressure reducing valves installed in the cartridge blocks respectively and configured to control opening rates of the signal passages according to electric control signals.

7. The pilot signal block assembly of claim 6, wherein a receiving hole of the plurality of receiving holes provides a pressure space in which the pilot oil for pressurizing the spool is supplied.

8. The pilot signal block assembly of claim 7, wherein a receiving hole of the plurality of receiving holes has a diameter greater than a diameter of the spool.

9. The pilot signal block assembly of claim 6, wherein a cartridge block of the plurality of the cartridge blocks comprises a pump passage configured to supply the pilot oil to a corresponding signal passage of the signal passages and a drain passage connected to the pump passage to drain the pilot oil from the cartridge block.

10. The pilot signal block assembly of claim 9, wherein a base block of the at least two base blocks further comprises a pump distribution passage and a drain collection passage, wherein the pump distribution passage is in fluid communication with the pump passage such that the pilot oil is distributed and supplied into the pump passage, and the drain collection passage is in fluid communication with the drain passage such that the pilot oil drained from the drain passage is collected by the drain collection passage.

11. The pilot signal block assembly of claim 10, wherein the base block further comprises an inlet port connected to a pilot oil pump such that the pilot oil is supplied into the base block through the inlet port; and
an outlet port connected to an oil tank such that the pilot oil collected by the drain collection passage is drained to the oil tank through the outlet port.

12. The pilot signal block assembly of claim 6, wherein the second direction is substantially perpendicular to the first direction.

13. A control valve assembly, comprising:
a main block having a spool that is installed movably therein to control a path into which a working fluid discharged from a hydraulic pump flows;
a first pilot signal block assembly comprising:
   at least two base blocks arranged on a first side of the main block and spaced apart from each other and having a plurality of receiving holes configured to facilitate movement of the spool in one direction,
   a plurality of cartridge blocks arranged on a surface of the at least two base blocks and spaced apart from each other, each of the cartridge blocks including a first signal passage that is in fluid communication with a corresponding receiving hole of the plurality of receiving holes to supply a pilot oil to the corresponding receiving hole, and
   a first electro proportional pressure reducing valve installed in each of the cartridge blocks configured to control an opening rate of a corresponding first signal passage of the first signal passages according to an electric control signal; and
a second pilot signal block assembly comprising:
   at least two pilot signal blocks arranged on a second side of the main block opposite to the first side of the main block and spaced apart from each other and having a plurality of second signal passages configured to facilitate movement of the spool in a direction reverse of the one direction, and
   a second electro proportional pressure reducing valve installed in the second pilot signal block and configured to control an opening rate of a corresponding second signal passage of the second signal passages according to an electric control signal.

14. The control valve assembly of claim 13, wherein a receiving hole of the plurality of receiving holes is formed to penetrate through a base block of the at least two base blocks of the first pilot signal block assembly to provide a pressure space for moving the spool.

15. The control valve assembly of claim 13, wherein a cartridge block of the plurality of cartridge blocks of the first pilot signal block assembly comprises a first pump passage configured to supply the pilot oil to a corresponding first signal passage of the first signal passages and a first drain passage connected to the first pump passage to drain the pilot oil from the cartridge block.

16. The control valve assembly of claim 13, wherein the second pilot signal block assembly comprises a second pump passage configured to supply the pilot oil to a corresponding second signal passage of the second signal passages and a second drain passage connected to the second pump passage to drain the pilot oil from the second pilot signal block.

* * * * *

UNITED STATES PATENT AND TRADEMARK OFFICE
CERTIFICATE OF CORRECTION

Page 1 of 1

PATENT NO. : 9,651,159 B2
APPLICATION NO. : 14/719558
DATED : May 16, 2017
INVENTOR(S) : Dae Gyun Choi, Hee Seog Kong and Ki Hwan Hong It is certified that error appears in the above-identified patent and that said Letters Patent is hereby corrected as shown below:

In Claim 13:
Please insert the word --and-- into Line 19 of Column 11 after the word blocks Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*